April 21, 1959

H. O. MOORE 2,882,638

FISHING LURE AGITATOR

Filed June 26, 1956

HARRY O. MOORE,
INVENTOR

BY Eaton, Bell, Hunt + Seltzer
ATTORNEYS

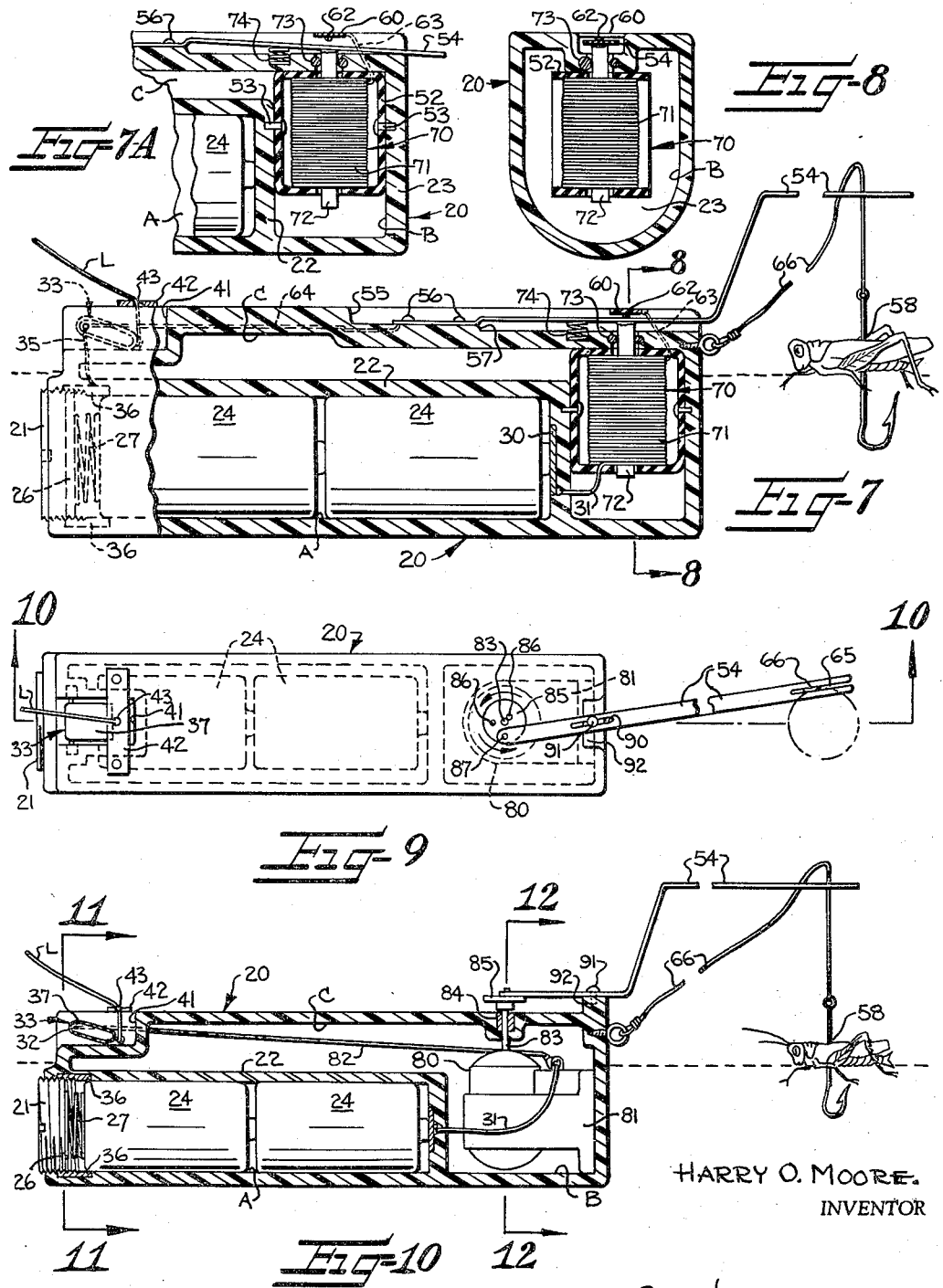

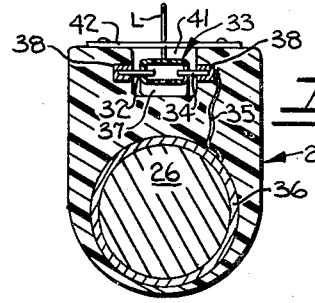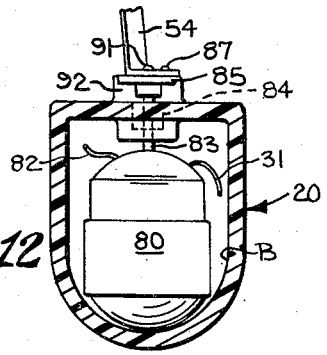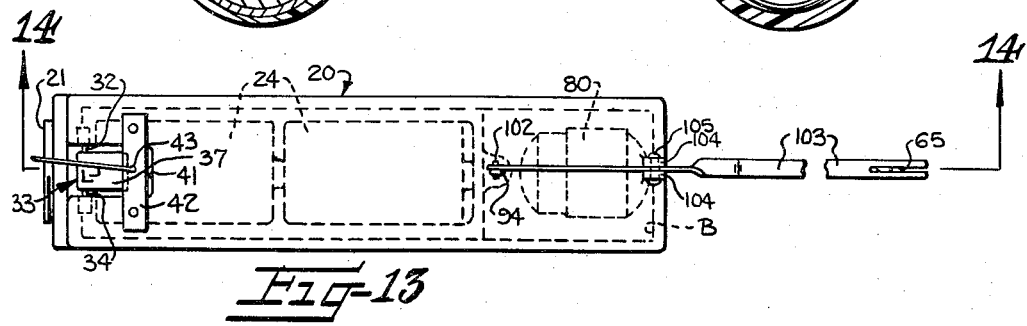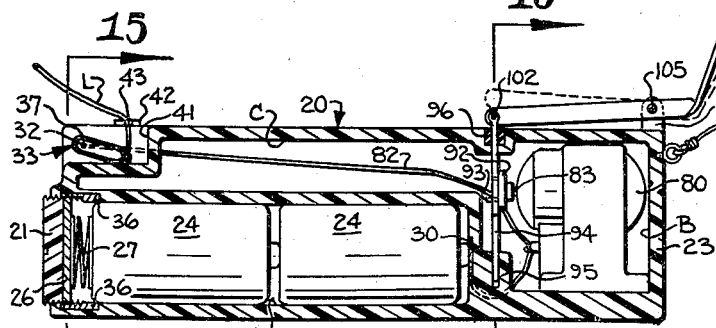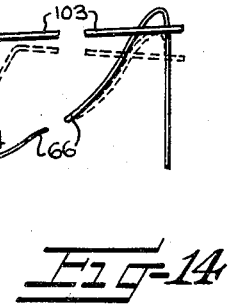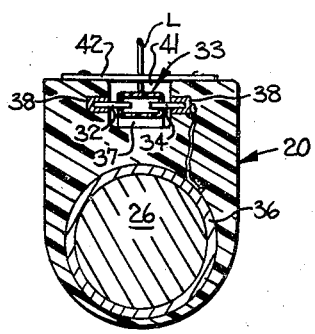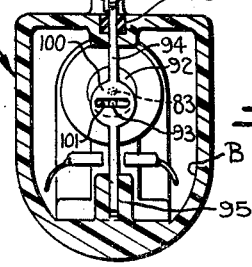

United States Patent Office 2,882,638
Patented Apr. 21, 1959

2,882,638
FISHING LURE AGITATOR

Harry O. Moore, Charlotte, N.C., assignor to Silabert Corporation, Charlotte, N.C., a corporation of North Carolina Application June 26, 1956, Serial No. 593,850

14 Claims. (Cl. 43—26.1)

This invention relates generally to the art of fishing and more particularly to an agitator for imparting realistic movement to fishing lures of the type which normally float upon the surface of the water, such as insects and artificial flies.

It is commonly known that when insects such as grasshoppers and flies fall into the water they customarily make futile attempts to fly out of the water, which attempts are accompanied by an intermittent jiggling motion of the insect in its attempt to free itself from the water. This intermittent jiggling motion of the insect is natural and the fish are therefore accustomed to watching for just such a motion to catch their prey.

Since the fish are naturally attracted to the prey by the jiggling motion of the insect, it is the primary object of this invention to provide a novel means for imparting artificial jiggling motion to a baited hook or fishing lure in a realistic manner without the necessity of manually manipulating the fishing line to jiggle the bait.

It is another object of this invention to provide a self-contained apparatus for imparting realistic motion to a fishing lure which apparatus may be used as an accessory with an existing and conventional fishing tackle without modification. The apparatus of the present invention is carried by a float attached to the end of a fishing line and allowed to float in the water adjacent the lure. The lure is attached by another line to the float and the entire assembly, including the float carrying the agitating mechanism and the lure, may be cast into the water in a conventional manner.

It is still another object of this invention to provide a self-contained power actuated agitator for fishing lures of the type described wherein switch means adapted to be closed by the tautness of the fishing line are incorporated in the agitator to permit a fisherman to control the agitator whereby agitation may be selectively imparted to the lure or the lure allowed to remain motionless on the water as desired. This feature further enhances the realistic jiggling of the lure as it is well known that insects when entrapped in water make intermittent efforts to escape and that they otherwise remain substantially motionless on the water between such efforts. The provision of the switch mechanism on the agitating device also prolongs the life of the power plant which motivates the agitator.

As more fully appears herein, the invention essentially comprises a buoyant waterproof housing in the form of a float, a source of power carried within the housing which may be in the form of dry cell batteries, and agitating means operatively connected to the source of power for imparting movement to the lure. Although the invention also contemplates the provision of switch means carried by the housing and connected to the fishing line to be actuated thereby to prolong the life of the batteries the invention is operable without the provision of the switch means. If the switch is not used the housing or float may be attached to a fishing line in any suitable manner.

Some of the objects of the invention having been stated, other objects will appear as the description proceeds when taken in connection with the accompanying drawings, in which—

Figure 7 is a view similar to Figure 2 but showing the left hand side in elevation and showing a modified form of the invention wherein a solenoid is employed for imparting agitation to the lure, which solenoid is shown in deenergized position;

Figure 7A is a fragmentary elevation of the right hand portion of Figure 7 showing the position of the parts when the solenoid is energized;

Figure 8 is a transverse vertical sectional view taken substantially along line 8—8 in Figure 7;

Figure 9 is a view similar to Figure 1 but on a reduced scale and showing another modified form of the invention wherein a vertically mounted small electric motor is employed for imparting horizontal rotational movement to the lure;

Figure 10 is a longitudinal vertical sectional view taken substantially along line 10—10 in Figure 9;

Figure 11 is a transverse vertical sectional view taken substantially along line 11—11 in Figure 10;

Figure 12 is a transverse vertical sectional view taken substantially along line 12—12 in Figure 10;

Figure 13 is a view similar to Figure 9, but showing still another modified form of the invention wherein the small electric motor is horizontally mounted for imparting vertical reciprocatory movement or agitation to the lure;

Figure 14 is a longitudinal vertical sectional view taken substantially along line 14—14 in Figure 13;

Figure 15 is a transverse vertical sectional view taken substantially along line 15—15 in Figure 14; and Figure 16 is a transverse vertical sectional view taken substantially along line 16—16 in Figure 14.

Referring more specifically to the drawings, the numeral 20 broadly designates a hollow waterproof buoyant housing or float which may be formed from plastic, balsa or any other suitable material and which is provided with a cap or plug 21 threaded into one end thereof in a waterproof manner and a front wall 23. The housing 20 is preferably provided with a rounded bottom portion, which shape insures that the housing will always float in upright position when suitable ballast is positioned in the lower portion thereof. The external surface of the housing 20 may be painted or camouflaged in a suitable manner to simulate a piece of a branch or log so as not to startle or frighten the fish.

Figure 1:
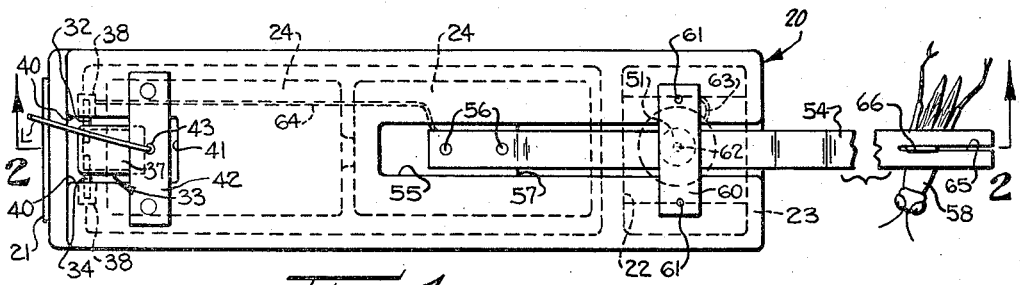
Figure 1 is a top plan view of the agitating device showing hidden features thereof in dotted lines.
Figure 2:
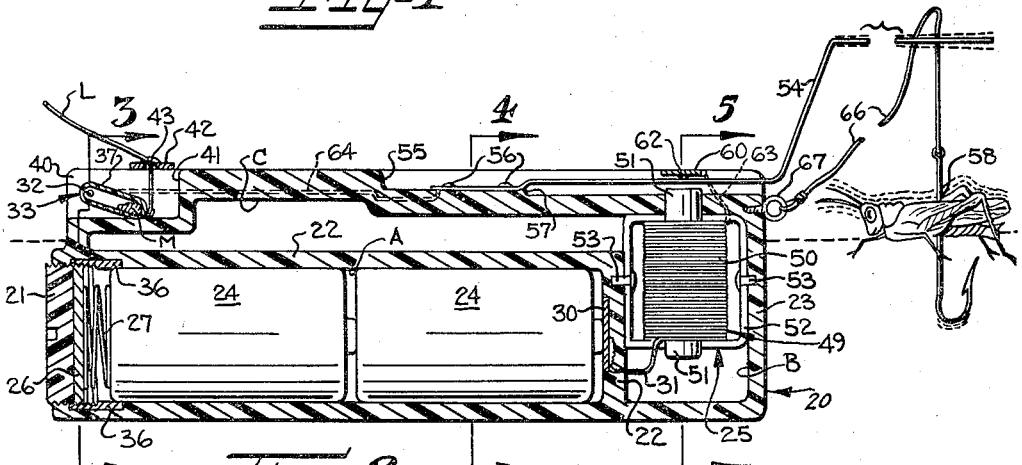
Figure 2 is a longitudinal vertical sectional view taken substantially along line 2—2 in Figure 1.
Figures 3, 4, 5:
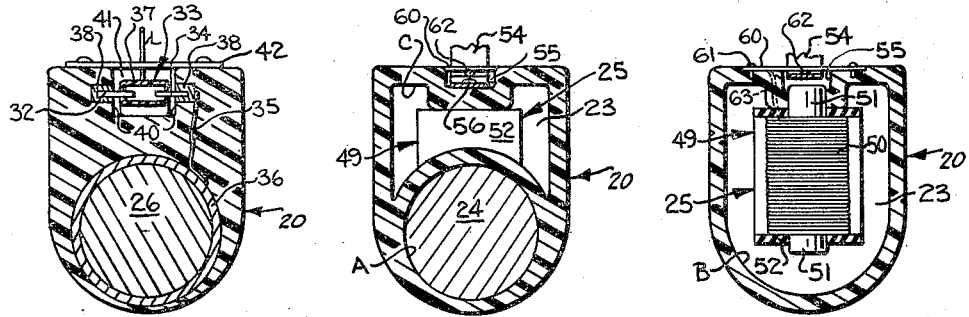
Figure 3 is a transverse vertical sectional view taken substantially along line 3—3 in Figure 2.
Figure 4 is a transverse vertical sectional view taken substantially along line 4—4 in Figure 2.
Figure 5 is a transverse vertical sectional view taken substantially along line 5—5 in Figure 2.
Figure 6:
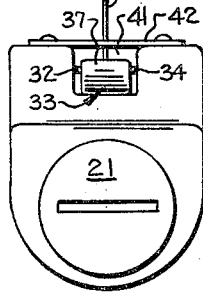
Figure 6 is an end view of the agitating device looking at the left side of Figure 1.

The interior of the hollow housing 20 is divided into a plurality of compartments by an L-shaped wall or partition 22, the longitudinal portion of which is preferably of arcuate configuration in cross section as seen in Figure 4. One end of the L-shaped wall 22 is formed integral with the end of the housing adjacent the plug 21 and the other or transverse end portion of the wall 22 is formed integral with the bottom or hull of the housing or float 20 at a point spaced rearwardly of the front wall 23.

The L-shaped wall 22 thus defines a lower compartment

A, a forward compartment B, and an upper compartment C which communicates with the forward compartment B. The lower compartment A serves as a receptacle for a pair of storage batteries 24 while the forward compartment B and upper compartment C provide air space to impart buoyancy to the float. The forward compartment B also houses electrically operable motive or power actuated means, generically indicated by the reference numeral 25, which is engageable with or operatively connected to a lure agitating arm or lever to which a suitable lure or bait is attached.

The plug 21 has a metal plate 26 fixed to the inner surface thereof and a spring 27 is secured to the plate 26 to normally urge the batteries 24 against a contact or terminal 30 fixed to the transverse portion of the L-shaped wall 22, the batteries 24 being inserted within the compartment A just as similar batteries are positioned within a flashlight.

A wire or electrical conductor 31 extends between the terminal or contact 30 and the power actuated means 25. The power actuated means 25 is also connected by suitable electrical conductors to one terminal 32 of a switch, broadly indicated at 33, connected to the housing 20 adjacent the plug 21, and another wire or electrical conductor 35 is connected to the other terminal 34 of switch 33. The wire 35 extends from the terminal 34 to a metal ring or insert 36 extending about the peripheral end of the chamber A and being threadably engaged by the metal plate 26 on the inner surface of the plug 21. The circuit is completed by the spring 27 connected to the plate 26 and engaged with one of the batteries 24.

The switch 33 may be of any suitable structure, such as a mercury switch comprising an enclosed hollow tube or vial 37 which may be formed of plastic or other suitable material in which is disposed a small amount of mercury M. Suitable means are fixed to the end of the tube or vial 37 remote from the terminals 32, 34 for fixing one end of a fishing line L to the switch 33. The terminals 32, 34 extend into the vial 37 toward each other and have their inner ends spaced apart to provide a normally open circuit. The opposed terminals 32 and 34 also extend outwardly from the vial 37 in opposite directions and their respective outer ends are suitably journaled in metal bearings 38 mounted in shoulders 40 which define opposite sides of a slot 41 formed in the upper wall of the housing 20. The terminals 32, 34 thus serve as pivot means for permitting pivotal movement of the mercury switch 33 within the slot 41 relative to the housing 20. The slot 41 is bridged by a transverse plate 42 having an eyelet 43 therein through which the fishing line L extends between the mercury switch M and the fishing rod, not shown.

The mercury switch M is operable to deactivate the power actuated means 25 by slackening the fishing line L so as to permit the free end of the vial 37 to move by gravity below the level of the pivoted terminals 32, 34 to cause the mercury M within the vial 37 to move away from the spaced terminals 32, 34, thus breaking the circuit to deactivate the power actuated means 25. The device may be activated by tightening the line L to elevate the free end of the vial 37 above the level of the spaced terminals 32, 34 to cause the mercury M to bridge the terminals 32 and 34 to complete the circuit thereby activating the power actuated means 25.

The connection of the line L with the switch 33 serves as means for retrieving the entire assembly by pulling in on the line L. When the free end of the vial 37 is elevated by pulling in on the line L, the free end of the vial 37 to which the line L is attached engages the under surface of the plate 42 thereby causing the vial 37 to bear against the under surface of the plate 42 to prevent further movement of switch 33 relative to the housing 20. Once the float is removed from the water, the weight of the float will cause the end thereof remote from the switch 33 to depend thereby moving the mercury M away from the terminals 32 and 34 to deactivate the power actuated means 25. Thus, the device is not functioning when landing a fish.

It should be noted that when the float is floating in the water in normal usage, the buoyancy of the float is such that the water line is below the bottom wall of the slot 41 so that the exposed portions of the terminals 32 and 34 are out of the water to prevent the circuit from being completed until the mercury M bridges the terminals.

The foregoing structure and operation are common to all forms of the invention and like reference characters are employed throughout to identify like parts.

Referring now to Figures 1 through 6 of the drawings, there will be observed one form of the invention wherein the power actuated means 25 comprises an electro-magnet 49 having a coil 50 and a core 51 energized by the coil 50. The coil 50 and core 51 are mounted in a suitable bracket 52 fixed within the compartment B as by rivets or pins 53. One end of the core 51 extends upwardly through the top of the housing 20 for engagement with an armature in the form of a leaf spring lure agitating arm or lever 54. One end portion of the armature or leaf spring lever 54 is disposed within a longitudinal slot 55 in the upper wall of the housing 20 and is fixed to the housing 20 as by pins or rivets 56 fastened to a shoulder 57 formed in the lower wall of the slot 55, the other or free end portion of the lever 54 extending outwardly beyond the front wall 23 of the housing 20 and to the free end of which the lure 58 is attached.

The slot 55 is bridged by a transverse metal plate 60 disposed above the core 51, the plate 60 being held in place by suitable pins or rivets 61 embedded in the top wall of the housing 20. A terminal or contact 62 is fixed to the under surface of the plate 60 which is engageable by the leaf spring lever 54, said leaf spring lever 54 being normally biased into engagement with the contact 62.

In this form of the invention, the power actuated means 25 in the form of electro-magnet 49 is connected to the terminal 32 of switch 33 by a wire 63 which extends from one side of the electro-magnet 49 to the plate 60, and the fixed end of the lever 54 is connected to the terminal 32 by a wire 64.

Since the leaf spring lever or armature 54 is formed of metal, the armature 54 completes the circuit when it is engaged with the contact 62 on the plate 60, assuming the mercury M in switch 33 has bridged the terminals 32 and 34. When the circuit is completed, the coil 50 sets up a magnetic field to cause the core 51 to draw the armature 54 downwardly into engagement with the core 51 and out of engagement with the contact 62 thereby breaking the circuit. Immediately thereafter, the armature 54 is permitted to return to its normal position in engagement with the contact 62 which again completes the circuit. Thus, so long as the mercury M within the switch 33 bridges the terminals 32 and 34, the armature 54 fluctuates rapidly between the contact 62 and the core 51 imparting vertical reciprocatory movement to the free end of the armature 54.

The armature 54 is preferably bent upwardly adjacent the front wall 23 of the housing 20 and then outwardly in substantially parallel relation to the housing 20. This elongation and configuration of the armature 54 not only positions it far enough above the water to permit the lure to be positioned on the surface of the water directly beneath the armature 54, but also increases the vertical movement of the free end of the armature 54, thus imparting a more realistic jiggling movement to the lure.

The free end of the armature 54 is preferably bifurcated as at 65 in order to provide simple but effective means for releasably attaching a line 66 to the lever 54. The line 66 is first drawn upwardly between the arms defined by the bifurcated end of the lever 54 and then downwardly between the arms to define a loop adjacent the upper surface of the lever 54, it being understood that the line 66 is frictionally engaged by the arms in such a manner that the relatively light weight of the lure 58 may be supported, and yet the line will be readily removed from the lever 54 upon a fish striking the lure. One end of the line 66 is fastened to the housing 20 as by a screw eye 67, and the other end of the line 66 is fastened to the lure 58.

Referring now to Figures 7 and 8, there will be observed a modified form of the invention wherein the power actuated means comprises a solenoid 70 including a coil 71 surrounding a core or plunger 72 which extends through the top wall of the housing and engages the lever 54. The electrical circuit and other features of the invention heretofore described are unchanged, but in this form of the invention the plunger 72 is fixed to the lever 54, as by welding. Since the plunger 72 is movable relative to the coil 71, a suitable O-ring 73 surrounds the upper portion of the plunger 72 to form a water-tight seal or bushing. In addition to being normally biased into engagement with the contact 62, the leaf spring lever 54 is additionally urged into engagement with the contact 62 by a spring 74 mounted in a well in the upper wall of the housing 20 and extending between the housing 20 and the under surface of the leaf spring lever 54.

Upon the mercury switch 33 being actuated to complete the circuit, the solenoid coil 71 is energized to move the plunger 72 downwardly thereby pulling the lever 54 downwardly and out of engagement with the contact 62 to break the circuit as shown in Figure 7A. When the circuit is thus broken, the armature or leaf spring lever 54 is returned to engagement with the contact 62 by the action of the spring 74 and the spring action of the lever 54 itself. This again completes the circuit and the cycle is repeated thereby imparting vertical reciprocatory movement to the lever 54 and to the bait 58 attached thereto in the manner heretofore described.

In order to more accurately simulate the natural movements of some insects entrapped on the surface of water, another modification of the invention is provided, as shown in Figures 9, 10, 11 and 12, for imparting horizontal rotational movement to the lever 54 and to the lure 58 suspended therefrom, rather than vertical reciprocatory movement as heretofore described. Such rotational movement is imparted to the lever 54 and to the lure by means of a small electric motor 80 mounted on a vertical axis in the chamber or compartment B and supported therein by a suitable support 81 secured to the front wall 23 of the housing 20.

The electrical circuit in this form of the invention differs from that heretofore described in connection with the foregoing forms of invention in that in the present form of invention a wire 82 leads directly from the motor 80 to the terminal 32 in the mercury switch 33, rather than passing through a portion of the lever 54 as is the case when utilizing an electro-magnetic device for imparting movement to the lever 54.

The motor 80 is provided with a rotatable shaft 83 which extends upwardly through the top wall of the housing 20 and is journaled in a suitable bushing 84 disposed within a well in the top wall of the housing 20. A cam plate or eccentric 85 is fixed to the upper end of the shaft 83, said cam plate 85 being provided with a plurality of transverse apertures or bores 86 arranged radially about the axis of the shaft 83 in varying spaced relation therefrom. The end of the lever 54 remote from the bifurcated end 65 has connected thereto a vertical pin or stud 87 depending therefrom and selectively engageable with one of the bores 86 to impart oscillating movement in a desired arc to the lever 54. The medial portion of the lever 54 is provided with a longitudinal slot 90 penetrated by a pin 91 fastened in the upper wall of a shoulder 92 extending upwardly from the front wall 23 of the housing 20.

Thus, as the motor is energized by actuation of the mercury switch 33, the shaft 83 will be rotated in a counterclockwise direction to impart rotational movement to the lure on the surface of the water in a clockwise direction through oscillation of the lever 54.

The size of the circle defined by the lure as it moves over the surface of the water may be varied as desired by repositioning the stud 87 on the arm 54 in a selected bore 86 on the cam plate 85. Of course, the closer the stud 87 is positioned to the shaft 83, the smaller the circle described by the lure in the water.

The electric motor 80 may also be utilized to impart vertical reciprocatory jiggling movement to the bait on the surface of the water by positioning the motor 80 within the compartment B on its horizontal axis so that the shaft 83 extends horizontally as shown in the modified form of invention in Figures 13, 14, 15 and 16. The electrical circuit is the same in this form of invention as in the form of invention shown in Figures 9, 10, 11 and 12, and a suitable support 81 is likewise utilized to support the motor 80 within the chamber B on a horizontal axis.

Here, a cam plate or eccentric 92 is fixed to the end of a shaft 83, said cam plate 92 being provided with an eccentrically located pin or stud 93 which extends from the plate 92 in a plane parallel to the plane of the shaft 83. A vertically disposed crank 94 is suitably journaled at its lower end in a shoulder 95 extending forwardly from the transverse or vertical portion of the L-shaped wall 22. The upper end of the crank 94 extends through the top wall of the housing 20 and is journaled in a suitable bushing 96.

The crank 94 is provided with a centrally located circular disc or boss 100 having a transverse slot 101 therein penetrated by the eccentrically located pin 93 on the cam plate 92. Rotation of the shaft 83 thus imparts vertical reciprocatory movement to the crank 94.

The upper end of the crank 94 is pivotally connected as at 102 to one end of a lever 103 and the medial portion of the lever 103 is pivotally connected to the housing 20 in vertically spaced relation therefrom as by a pair of lugs 104 and a pivot pin 105. The lever 103 is preferably bent at right angles upon itself and upwardly at a point spaced forwardly of the lugs 104 so that the free end of the lever 103 is similar to the free end of the lever 54, heretofore described. As most clearly seen in Figures 13 and 14, the line 66 is fastened to the free end of the lever 103 and to the housing 20 in the same manner as in the other forms of the invention.

Thus, upon the mercury switch 33 being activated to energize the motor 80, rotation will be imparted to the cam plate 92 to cause the crank 94 to reciprocate vertically thereby imparting similar movement to the lever 103 causing the bait in the water to jiggle vertically.

It is thus seen that there have been provided several forms of a novel device for automatically and selectively imparting agitation to bait on the surface of the water so as to simulate the natural movements of an insect entrapped on the surface of the water.

In the drawings and specification there have been set forth preferred embodiments of the invention and, although specific terms are employed, they are used in a generic and descriptive sense only and not for purposes of limitation, the scope of the invention being defined in the claims.

I claim:

1. A fishing lure agitator comprising a water-tight housing attached to the end of a fishing line and adapted to float on the surface of the water, a lever connected to the housing and extending outwardly beyond one edge of said housing, a second line fixed at one end to the housing and having a fishing lure fixed to its other end, means releasably connecting said second line intermediate its ends to the free end of the lever, and power means carried by the float and operatively connected to the lever for imparting movement to the lever to agitate the fishing lure.

2. A fishing lure agitator comprising a waterproof buoyant housing adapted to float in the water, an electric motor carried by said housing and an electrical circuit connecting said motor to a source of electrical energy, means for mounting said motor on its vertical axis within said housing, a rotatable shaft extending from said motor through the top wall of the housing, a lever oscillatably connected at one of its ends to the shaft, said lever extending from the shaft in right-angular relation thereto beyond one edge of the housing and having a fishing lure connected to its free outer end, and means pivotally and slidably connecting the lever at a point between its ends to the housing whereby rotation of the shaft will cause oscillation of the lever to impart rotational movement to the fishing lure.

3. A structure according to claim 4 wherein means are provided for selectively varying the distance between said one end of the lever and the axis of the shaft to accordingly selectively vary the path of rotational movement of the fishing lure in the water.

4. A structure according to claim 3 wherein said last-mentioned means comprises a cam plate fixed to the end of the shaft, said cam plate having a plurality of bores therein arranged radially about the axis of the shaft in varying spaced relation therefrom, and a stud extending in right angular relation from said one end of the lever selectively engageable with the bores in said cam plate.

5. A fishing lure agitator comprising a buoyant housing adapted to float in the water, an electric motor carried by said housing and an electrical circuit connecting said motor to a source of electrical energy, said motor having a rotatable shaft extending therefrom, a lever operatively connected to the shaft and extending outwardly beyond said housing, a fishing lure connected to the outer end of the lever whereby upon rotation of said motor shaft, agitation will be imparted to the fishing lure, and means providing continuous remote control of the agitation of said fishing lure from a point distant from said agitator to selectively operate and shut off said motor.

6. A fishing lure agitator comprising a hollow water tight buoyant housing adapted to float in the water, storage batteries disposed within the housing adjacent its bottom and said storage batteries serving as ballast to cause the housing to float in the water in an upright manner, an electric motor carried by said housing and an electrical circuit connecting said motor to said storage batteries, said motor having a rotatable shaft, a switch pivotal between open and closed position and disposed in the circuit for selectively controlling the flow of current to said motor, a line attached to said pivotable switch and extending therefrom to a point remote from said agitator, said line providing continuous remote control of said pivotable switch between open and closed position to selectively operate and shut off said motor, and a lever connected to the housing and extending outwardly beyond the housing and having a fishing lure connected adjacent its outer end and said lever being operatively connected to said motor whereby upon the switch closing the circuit, the lever will be moved to agitate the fishing lure connected thereto.

7. An electrically operable device for imparting agitation to a fishing lure comprising a water-tight buoyant housing adapted to float in the water, a source of electrical energy disposed within said housing, electrically operable motive means carried by said housing, an electrical circuit extending between said source of electrical energy and said electrically operable motive means, a lever carried by said housing and extending beyond one edge of the housing and having a fishing lure depending from the free end thereof, means operatively connecting said lever to said electrically operable motive means to agitate said fishing lure, said fishing lure thereby simulating the movements of a living object to more readily attract a fish thereto, and means providing continuous remote control of the agitation of said fishing lure from a point distant from said housing to selectively operate and shut off said electrically operable motive means.

8. An electrically operable device for imparting agitation to a fishing lure as defined in claim 7, wherein said means for providing continuous remote control of the agitation of said fishing lure comprises switch means connected to said housing and disposed in said electrical circuit, and means for continuously and selectively controlling said switch means from a point remote from said housing between closed and open positions to activate and deactivate said electrically operable motive means; said last-mentioned means comprising a line connected to the switch means and extending therefrom to a point remote from said housing, and said line providing a means to retrieve said housing.

9. An electrically operable device for imparting agitation to a fishing lure as defined in claim 7, wherein said electrically operable motive means comprises an electro-magnet, said lever comprises a leaf spring armature, and said means operatively connecting said lever to said electrically operable motive means to agitate said fishing lure comprises a contact in said electrical circuit, said contact being secured to the housing in spaced relation from the electro-magnet, said leaf spring armature being fixed at one end to the housing at a point spaced inwardly from the contact and extending outwardly between said contact and said electro-magnet beyond one edge of the housing to its free end where said fishing lure is attached, and said leaf spring armature being normally biased into engagement with the contact to complete the electrical circuit, whereby the electro-magnet is energized to magnetically draw the leaf spring armature away from the contact to break the circuit and de-energize the electromagnet to permit the leaf spring armature to return to engagement with the contact to again complete the circuit thereby successively repeating the cycle to impart agitation to the fishing lure carried by said leaf spring armature.

10. An electrically operable device for imparting agitation to a fishing lure as defined in claim 7, wherein said electrically operable motive means comprises an electromagnetic solenoid having a movable core, said lever comprises an armature, and said means operatively connecting said lever to said electrically operable motive means to agitate said fishing lure comprises a contact in said electrical circuit, said contact being secured to the housing adjacent one end of the movable core of the solenoid, means securing said one end of the movable core to said armature at a point between the ends of the armature, and means normally urging said armature into engagement with said contact to complete the electrical circuit; said armature being fixed at one end to the housing at a point spaced inwardly from the contact and extending outwardly between said contact and said one end of the movable core beyond one edge of the housing to its free end where said fishing lure is attached, said solenoid being energized upon completion of the electrical circuit to move the movable core and the armature away from the contact to break the circuit and de-energize the solenoid to permit the armature to return to its normal position in engagement with the contact to again complete the circuit thereby successively repeating the cycle to impart agitation to the fishing lure carried by said armature.

11. An electrically operable device for imparting agitation to a fishing lure as defined in claim 7, wherein said electrically operable motive means comprises an electric motor mounted on its horizontal axis in the housing and having a rotatable shaft extending therefrom, and said means operatively connecting said lever to said electrically operable motive means to agitate said fishing lure comprises a cam plate fixed to the extended end of the shaft, an eccentrically located pin extending from the cam plate in parallel relation to the shaft, and a crank connected to the pin, said crank having one end extending through one wall of the housing; said lever being pivotally connected at one of its ends to said one end of the crank and extending beyond one edge of the housing to its free other end where said fishing lure is attached, and means pivotally connecting the lever to said housing at a point between the ends of the lever, whereby said fishing lure is agitated by rotation of the shaft causing oscillation of the crank to impart reciprocatory movement to the lever and to the fishing lure.

12. A fishing lure agitator comprising a hollow watertight buoyant housing adapted to float in the water, storage batteries disposed within the housing adjacent its bottom, said storage batteries serving as ballast to cause the housing to float in the water in an upright manner, a lever connected to the exterior of the housing and extending outwardly beyond one edge of the housing, said lever having a fishing lure connected to its outer end, electrically operable power means disposed within the float, an electrical circuit connecting said power means to the storage batteries, switch means disposed in said circuit for selectively controlling the flow of current to said electrically operable power means, said switch means comprising a mercury switch including a vial closed at both ends, a quantity of mercury disposed in said vial, and means pivotally connecting the vial to said housing for pivoting said vial relative to the housing to move the mercury within the vial to open and close the circuit; and means operatively connecting the power means to the lever to agitate the fishing lure, said fishing lure thereby simulating the movements of a living object to more readily attract a fish thereto.

13. A fishing lure agitator as defined in claim 12, wherein a line is attached to one end of the vial, said line extending to a point remote from the housing for continuously controlling the agitator through said mercury switch.

14. A fishing lure agitator as defined in claim 13, wherein the mercury switch is pivotally connected to the housing at a point remote from the fishing lure, and means limiting pivotal movement of the mercury switch relative to the housing.

References Cited in the file of this patent

UNITED STATES PATENTS

| | | |
|---|---|---|
| 726,020 | Bryan | Apr. 21, 1903 |
| 1,251,810 | Oehler | Jan. 1, 1918 |
| 1,955,192 | Kettering | Apr. 17, 1934 |
| 2,205,352 | Fisher | June 18, 1940 |
| 2,224,471 | Burgin | Dec. 10, 1940 |
| 2,374,752 | Johnson | May 1, 1945 |
| 2,464,309 | Harshman | Mar. 15, 1949 |
| 2,545,185 | Winslow | Mar. 13, 1951 |
| 2,577,229 | Carnes | Dec. 4, 1951 |
| 2,665,591 | Casselman | Jan. 12, 1954 |
| 2,684,419 | Gerlach | July 20, 1954 |
| 2,707,843 | Howe | May 10, 1955 |
| 2,709,316 | McCabe | May 31, 1955 |
| 2,746,198 | Smith | May 22, 1956 |

FOREIGN PATENTS

| | | |
|---|---|---|
| 1,228 | Great Britain | Mar. 27, 1879 |